United States Patent
Pu et al.

(10) Patent No.: US 12,062,783 B2
(45) Date of Patent: Aug. 13, 2024

(54) POSITIVE ELECTRODE PLATE, SECONDARY BATTERY, BATTERY MODULE, BATTERY PACK, AND ELECTRICAL DEVICE

(71) Applicant: CONTEMPORARY AMPEREX TECHNOLOGY CO., LIMITED, Ningde (CN)

(72) Inventors: Jingjing Pu, Ningde (CN); Yanying Wu, Ningde (CN); Xinghui Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/331,246

(22) Filed: Jun. 8, 2023

(65) Prior Publication Data
US 2023/0335722 A1   Oct. 19, 2023

Related U.S. Application Data

(63) Continuation of application No. PCT/CN2022/072148, filed on Jan. 14, 2022.

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/5825* (2013.01); *H01M 4/625* (2013.01);
(Continued)

(58) Field of Classification Search
CPC .... H01M 4/366; H01M 4/5825; H01M 4/625; H01M 10/0525; H01M 2004/028; H01M 2220/20
See application file for complete search history.

(56) References Cited

U.S. PATENT DOCUMENTS

| | | | | |
|---|---|---|---|---|
| 2022/0344643 A1* | 10/2022 | Kwak | | H01M 4/366 |
| 2023/0111642 A1* | 4/2023 | Wu | | H01M 4/587 |
| | | | | 429/213 |
| 2023/0231144 A1* | 7/2023 | Zhu | | H01M 4/139 |
| | | | | 429/209 |

FOREIGN PATENT DOCUMENTS

| | | |
|---|---|---|
| CN | 107742709 A | 2/2018 |
| CN | 110071292 A | 7/2019 |

(Continued)

OTHER PUBLICATIONS

International Search Report for International Application PCT/CN2022/072148. mailed Sep. 26, 2022.

*Primary Examiner* — Matthew T Martin
*Assistant Examiner* — Ankith R Sripathi
(74) *Attorney, Agent, or Firm* — Ladas & Parry LLP (57) ABSTRACT

A positive electrode plate, a secondary battery, a battery module, a battery pack, and an electrical device are disclosed. The positive electrode plate includes a positive current collector, and a positive active material layer disposed on at least one surface of the positive current collector. The positive active material layer includes a first active material layer and a second active material layer that are sequentially stacked in a direction away from the surface. The first active material layer includes a first composite particle. The first composite particle includes a first lithium iron phosphate particle and a first carbon layer that coats a surface of the first lithium iron phosphate particle. The second active material layer includes a second composite particle. The second composite particle includes a second lithium iron phosphate particle and a second carbon layer that coats a surface of the second lithium iron phosphate particle.

13 Claims, 5 Drawing Sheets

(51) Int. Cl.
*H01M 4/58* (2010.01)
*H01M 4/62* (2006.01)
*H01M 10/0525* (2010.01)
*H01M 50/209* (2021.01)
*H01M 50/249* (2021.01)

(52) U.S. Cl.
CPC ..... *H01M 10/0525* (2013.01); *H01M 50/209* (2021.01); *H01M 50/249* (2021.01); *H01M 2004/028* (2013.01); *H01M 2220/20* (2013.01)

(56) References Cited

FOREIGN PATENT DOCUMENTS

| | | | | |
|---|---|---|---|---|
| CN | 110474019 | A | 11/2019 | |
| CN | 110581256 | A | 12/2019 | |
| CN | 111640940 | A | 9/2020 | |
| CN | 113036085 | A | 6/2021 | |
| JP | 2010267540 | A | 11/2010 | |
| JP | 2015125832 | A | 7/2015 | |
| KR | 216213552 | * | 4/2024 | .............. H01M 4/13 |

* cited by examiner

POSITIVE ELECTRODE PLATE, SECONDARY BATTERY, BATTERY MODULE, BATTERY PACK, AND ELECTRICAL DEVICE

CROSS REFERENCE TO RELATED APPLICATION

This application is a continuation of International Patent Application No. PCT/CN2022/072148, filed on Jan. 14, 2022, which is incorporated by reference in its entirety.

TECHNICAL FIELD

This application relates to the technical field of batteries, and in particular, to a positive electrode plate, a secondary battery, a battery module, a battery pack, and an electrical device.

BACKGROUND

Lithium-ion secondary batteries are widely used in electric vehicles and consumer electronic products by virtue of high energy density, high output power, long cycle life, little environmental pollution, and other advantages. A positive electrode plate is one of the key components of the lithium-ion secondary battery. The performance of the positive electrode plate exerts a significant effect on the electrochemical performance of the lithium-ion secondary battery.

With the wide application of lithium-ion secondary batteries, higher requirements are placed on the electrochemical performance of the lithium-ion secondary batteries, and also on the performance of positive electrode plates.

SUMMARY

This application provides a positive electrode plate, a secondary battery, a battery module, a battery pack, and an electrical device. The secondary battery can achieve a good trade-off between relatively high rate performance and a relatively high energy density.

To achieve the foregoing objective, a first aspect of this application provides a positive electrode plate, including: a positive current collector; and a positive active material layer disposed on at least one surface of the positive current collector. The positive active material layer includes a first active material layer and a second active material layer that are sequentially stacked in a direction away from the surface. The first active material layer includes a first composite particle. The first composite particle includes a first lithium iron phosphate particle and a first carbon layer that coats a surface of the first lithium iron phosphate particle. The second active material layer includes a second composite particle. The second composite particle includes a second lithium iron phosphate particle and a second carbon layer that coats a surface of the second lithium iron phosphate particle. A graphitization degree of the first composite particle is higher than a graphitization degree of the second composite particle.

Therefore, with respect to the positive electrode plate according to this embodiment of this application, on the one hand, the positive electrode plate includes two active material layers, and each active material layer includes a carbon-layer-coated lithium iron phosphate particle. The carbon layer is of relatively high conductivity, and can significantly improve conductivity of the active material layer and significantly improve a contact resistance between the positive active material layer and the positive current collector, thereby improving conductivity of the positive electrode plate, and in turn, improving the rate performance of a secondary battery that adopts the positive electrode plate. On the other hand, the two active material layers are a first active material layer and a second active material layer respectively. The first active material layer is disposed closer to the positive current collector. The graphitization degree of the first active material layer is relatively higher, and a solid content of a slurry configured to prepare the first active material layer is relatively low. The second active material layer is disposed away from the positive current collector. The graphitization degree of the second active material layer is relatively low, and a solid content of a slurry configured to prepare the second active material layer is relatively high. The difference between the solid content of the slurry configured to prepare the first active material layer and the solid content of the slurry configured to prepare the second active material layer results in a gradient difference in solvent concentration. The joint use of the two active material layers facilitates thick coating of the positive active material layer, and in turn, increase the energy density of the secondary battery that adopts the positive electrode plate.

In any embodiment, the graphitization degree of the first composite particle is 0.3 to 0.6, and optionally, the graphitization degree of the first composite particle is 0.3 to 0.5. The relatively high graphitization degree of the first composite particle further improves the conductivity of the first active material layer, and the solid content of the slurry containing the first composite particle is relatively low.

In any embodiment, the graphitization degree of the second composite particle is 0.05 to 0.3, and optionally, the graphitization degree of the second composite particle is 0.1 to 0.2. The relatively low graphitization degree of the second composite particle, on the basis of improving the conductivity of the second active material layer, increases the solid content in the slurry configured to prepare the second active material layer. The slurry with a low solid content and the slurry with a high solid content are used jointly to further reduce the difficulty of thick coating and increase the thickness of the positive active material layer.

In any embodiment, the first composite particle includes a primary particle. The second composite particle includes a secondary particle formed by aggregating a plurality of primary particles. An average particle diameter $D_{50}$ of the first composite particle is less than an average particle diameter $D_{50}$ of the second composite particle. The difference in particle size between the second composite particle and the first composite particle can form a porous structure, thereby improving kinetic performance of the secondary battery.

In any embodiment, the average particle diameter $D_{50}$ of the first composite particle is 1 μm to 4 μm, and optionally 1 μm to 3 μm. The first composite particle with a particle diameter falling within the foregoing range can increase the area of contacting the electrolytic solution, and improve the rate performance of the secondary battery; and, during formation of the first active material layer, can increase the compaction density, and in turn, increase the energy density of the secondary battery.

In any embodiment, the average particle diameter $D_{50}$ of the second composite particle is 6 μm to 12 μm, and optionally 8 μm to 10 μm. By using the second composite particle with a particle diameter falling within the foregoing range, the slurry is not prone to phenomena such as agglomeration when being made into the second active material layer, and the relatively large average particle diameter $D_{50}$ of the second composite particle can significantly enhance the rate performance of the secondary battery.

In any embodiment, the secondary particle is of a spherical or quasi-spherical morphology. A specific surface area of this morphology is relatively large, thereby increasing a contact area between the second composite particle and an electrolytic solution, facilitating the electrolytic solution in infiltrating the second composite particle, and in turn, improving transfer performance of lithium ions, and enhancing the rate performance of the secondary battery.

In any embodiment, a specific surface area of the first composite particle is 10 m$^2$/g to 15 m$^2$/g, and optionally 12 m$^2$/g to 14 m$^2$/g. The specific surface area of the first composite particle is relatively large, and the particles are dispersed evenly, thereby improving the effect of infiltrating the first composite particle by the electrolytic solution.

In any embodiment, a specific surface area of the second composite particle is 5 m$^2$/g to 10 m$^2$/g, and optionally 6 m$^2$/g to 8 m$^2$/g. The second composite particles have a relatively small specific surface area and a relatively large particle diameter, and can be arranged together with the first composite particles to form a relatively large number of pores, thereby facilitating transfer of lithium ions.

In any embodiment, a ratio of a coating weight CW1 of the first active material layer to a coating weight CW2 of the second active material layer is 0.8 to 1.2, and optionally, the ratio of the coating weight CW1 of the first active material layer to the coating weight CW2 of the second active material layer is 1. The first active material layer with a relatively high graphitization degree and the second active material layer with a relatively low graphitization degree coordinate with each other to improve the coating characteristics of the positive active material layer, especially to facilitate thick coating processing, and in turn, increase the overall thickness of the positive active material layer.

In any embodiment, the coating weight CW1 of the first active material layer satisfies 0.115 mg/cm$^2$≤CW1≤0.195 mg/cm$^2$.

In any embodiment, the coating weight CW2 of the second active material layer satisfies 0.115 mg/cm$^2$≤CW2≤0.195 mg/cm$^2$.

In any embodiment, the first active material layer includes a first conductive agent. On a basis that a total weight of the first active material layer is 100%, a mass percent of the first conductive agent is A. The second active material layer includes a second conductive agent. On a basis that a total weight of the second active material layer is 100%, a mass percent of the second conductive agent is B, where A<B, and optionally 1 wt %≤B−A≤3 wt %. Compared with the graphitization degree of the second active material layer, the graphitization degree of the first active material layer is relatively higher. On the basis of ensuring conductivity of the first active material layer, the dosage of the conductive agent in the first active material layer can be reduced, and the mass percent of the first composite particle can be increased, thereby increasing the energy density of the secondary battery.

In any embodiment, a powder compaction density of the first active material layer under a pressure of 600 MPa is 2.4 g/cc to 2.65 g/cc, and optionally 2.5 g/cc to 2.6 g/cc. The powder compaction density falling within the foregoing range can increase the energy density of the secondary battery significantly.

In any embodiment, a powder compaction density of the second active material layer under a pressure of 600 MPa is 2.2 g/cc to 2.45 g/cc, and optionally 2.35 g/cc to 2.45 g/cc. The particles in the slurry configured to prepare the second active material layer are excellent in fluidity, dispersivity, and processability. The particles in the second active material layer are of relatively high fluidity and can be dispersed uniformly, and, when used together with the slurry configured to prepare the first active material layer, facilitate preparation of the positive active material layer, and improve the quality of the positive electrode plate.

A second aspect of this application provides a secondary battery, including a positive electrode plate, a separator, and a negative electrode plate. The positive electrode plate is the positive electrode plate according to any embodiment of the first aspect of this application.

A third aspect of this application provides a battery module. The battery module includes the secondary battery according to the second aspect of this application.

A fourth aspect of this application provides a battery pack. The battery pack includes the secondary battery according to the second aspect of this application or the battery module according to the third aspect of this application.

A fifth aspect of this application provides an electrical device. The electrical device includes the secondary battery according to the second aspect of this application, the battery module according to the third aspect of this application, or the battery pack according to the fourth aspect of this application.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

REFERENCE NUMERALS

Y. thickness direction;
1. electrical device;
10. battery pack;
11. lower box;
12. upper box;

20. battery module;
30. secondary battery;
31. top cap assembly;
32. housing;
40. electrode assembly;
50. positive electrode plate;
51. positive current collector;
511. surface;
52. positive active material layer;
521. first active material layer;
522. second active material layer;
60. negative electrode plate;
70. separator.

DETAILED DESCRIPTION

The following describes and discloses in detail a positive active material and a preparation method thereof, a positive electrode plate, a secondary battery, a battery module, a battery pack, and an electrical device according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and preferably in sequence. For example, that a method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, or closed-ended inclusion. For example, the terms "include" and "comprise" may mean inclusion of other items that are not recited, or inclusion of only the items recited.

Unless otherwise expressly specified herein, the term "or" is inclusive. For example, the expression "A or B" means "A alone, B alone, or both A and B". More specifically, any one of the following conditions satisfies the condition "A or B": A is true (or existent) and B is false (or absent); A is false (or absent) and B is true (or existent); and, both A and B are true (or existent).

Positive Electrode Plate

According to a first aspect, an embodiment of this application discloses a positive electrode plate.

Figure 1:
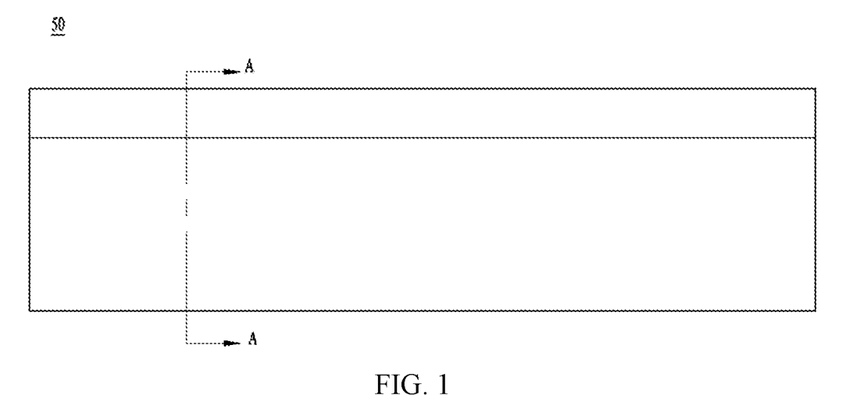
FIG. 1 is a schematic structural diagram of a positive electrode plate according to some embodiments of this application.
Figure 2:
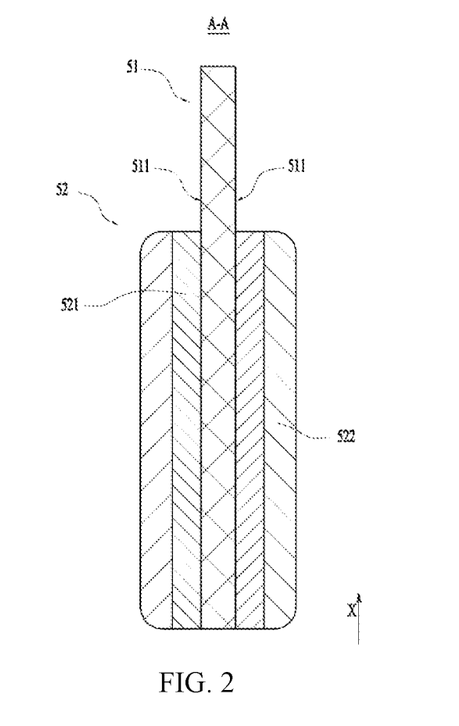
FIG. 2 is a sectional view of the positive electrode plate shown in FIG. 1 and sectioned along a line A-A.

FIG. 1 is a schematic structural diagram of a positive electrode plate according to some embodiments of this application, and FIG. 2 is a sectional view of the positive electrode plate shown in FIG. 1 and sectioned along a line A-A. As shown in FIG. 1 and FIG. 2, a positive electrode plate 50 according to an embodiment of this application includes a positive current collector 51 and a positive active material layer 52 disposed on at least one surface 511 of the positive current collector 51.

The positive current collector 51 includes two surfaces 511 opposite to each other in a thickness direction X of the positive current collector. The positive active material layer 52 is disposed on any one of the two surfaces 511 of the positive current collector 51, or on both surfaces 511 separately. The direction X shown in FIG. 1 is a thickness direction of the positive current collector 51.

The positive current collector 51 may be made of a metal or may be a composite current collector. In the case of being made of a metal, for example, the positive current collector may be a metal foil or a porous metal sheet such as aluminum or an aluminum alloy. Specifically, the positive current collector 51 is made of an aluminum foil. In the case of being a composite current collector, for example, the positive current collector may include a polymer material substrate and a metal layer formed on at least one surface 511 of the polymer material substrate. The composite current collector may be formed by overlaying the polymer material substrate with a metal material (for example, aluminum, aluminum alloy, nickel, nickel alloy, titanium, titanium alloy, silver, or silver alloy). The polymer material substrate may be, for example, polypropylene (PP), polyethylene terephthalate (PET), polybutylene terephthalate (PBT), polystyrene (PS), or polyethylene (PE).

The positive active material layer 52 includes a positive active material. The positive active material is a lithium iron phosphate active material. This material enables reversible deintercalation and intercalation of lithium ions and transfer of electrons during charge-and-discharge cycles. The positive current collector 51 collects and outputs current.

Generally, a ferrous ion in a lithium iron phosphate particle is located at a 4c site of an oxygen octahedron, and a lithium ion is located at a 4a site of the oxygen octahedron. The structure of a polyanion phosphate ion is of relatively high thermal stability. However, $FeO_6$ octahedra are separated by oxygen atoms in tetrahedral phosphate ions and thereby fail to form a continuous $FeO_6$ network, resulting in a relatively low electronic conductivity of the lithium iron phosphate particles. In addition, a diffusion coefficient of lithium ions in the lithium iron phosphate particles is relatively low. The low electrical conductivity and low lithium-ion diffusion coefficient of the lithium iron phosphate particles result in relatively low rate performance of the material that adopts such lithium iron phosphate particles.

The carbon layer has the advantages of high electrical conductivity and a large specific surface area. The applicant hereof attempts to coat the surface of the lithium iron phosphate particle with a carbon layer to form a graphitized lithium iron phosphate particle, so as to build a good conductive network on the surface of the lithium iron phosphate particle, and in turn, improve the conductivity of the positive electrode plate 50. However, the applicant hereof finds that in order to improve the conductivity of the positive electrode sheet, because the graphitization degree of the lithium iron phosphate particle is relatively high, the lithium iron phosphate particle with a relatively high graphitization degree increases the difficulty of forming a positive active material layer by coating, and is adverse to thick coating processing.

In view of the above problem, in an embodiment of this application, the positive active material layer 52 is divided into two layers. In other words, the positive active material layer 52 includes the first active material layer 521 and a second active material layer 522 that are sequentially stacked in a direction away from the surface 511 of the positive current collector 51. Both active material layers adopt graphitized lithium iron phosphate particles. Specifically, the first active material layer 521 is disposed close to the surface 511 of the positive current collector 51, and the second active material layer 522 is disposed away from the surface 511 of the positive current collector 51. The first active material layer 521 includes a first composite particle. The first composite particle includes a first lithium iron phosphate particle and a first carbon layer that coats a surface 511 of the first lithium iron phosphate particle. The second active material layer 522 includes a second composite particle. The second composite particle includes a second lithium iron phosphate particle and a second carbon layer that coats a surface 511 of the second lithium iron phosphate particle. Each layer can improve conductivity, and can significantly improve a contact resistance between the entire positive active material layer 52 and the positive current collector 51, thereby improving conductivity, and in turn, improving the rate performance of a secondary battery that adopts the positive active material layer 52.

The term "graphitization degree" herein means a degree to which carbon atoms form a close-packed hexagonal graphite crystal structure. The closer the lattice size is to the lattice parameters of ideal graphite, the higher the graphitization degree. The graphitization degree herein is used to characterize the carbon coating layer of lithium iron phosphate.

The graphitization degree varies between the two active material layers. The graphitization degree of the first composite particle of the first active material layer 521 is higher than the graphitization degree of the second composite particle of the second active material layer 522. In other words, the first composite particle is of a higher graphitization degree, and is less compatible with the solvent, such as N-methyl-pyrrolidone (NMP), in the slurry, and is less dispersible. The solid content in the slurry configured to prepare the first active material layer 521 is relatively lower. In addition, when the graphitization degree of the lithium iron phosphate particle is relatively high, the particles can slip easily against each other, thereby enhancing the flexibility of the positive electrode plate 50 and reducing the risk of corner cracking during winding of the electrode assembly. The graphitization degree of the second composite particle is relatively low. Therefore, the second composite particle is more compatible with the solvent, such as N-methyl-pyrrolidone (NMP), and is highly dispersible. The solid content in the slurry configured to prepare the second active material layer 522 is relatively higher. Due to the difference in solid content, a gradient difference in solvent concentration can be formed between the slurry configured to prepare the first active material layer 521 and the slurry configured to prepare the second active material layer 522, thereby facilitating thick coating of the positive active material layer 52, and in turn, increasing the energy density of the secondary battery.

With respect to the positive electrode plate 50 according to this embodiment of this application, on the one hand, the positive electrode plate 50 includes two active material layers, and each active material layer includes a carbon-layer-coated lithium iron phosphate particle. The carbon layer is of relatively high conductivity, and can significantly improve conductivity of the active material layer and significantly improve a contact resistance between the positive active material layer 52 and the positive current collector 51, thereby improving conductivity of the positive electrode plate 50, and in turn, improving the rate performance of a secondary battery that adopts the positive electrode plate 50. On the other hand, the two active material layers are a first active material layer 521 and a second active material layer 522 respectively. The first active material layer 521 is disposed closer to the positive current collector 51. The graphitization degree of the first active material layer 521 is relatively higher, and a solid content of a slurry configured to prepare the first active material layer 521 is relatively low. The second active material layer 522 is disposed away from the positive current collector 51. The graphitization degree of the second active material layer 522 is relatively low, and a solid content of a slurry configured to prepare the second active material layer 522 is relatively high. The difference between the solid content of the slurry configured to prepare the first active material layer 521 and the solid content of the slurry configured to prepare the second active material layer 522 results in a gradient difference in solvent concentration. The joint use of the two active material layers facilitates thick coating of the positive active material layer 52, and in turn, increase the energy density of the secondary battery that adopts the positive electrode plate 50.

Therefore, the positive electrode plate 50 according to this embodiment of this application enables the secondary battery to achieve a good trade-off between relatively high rate performance, a relatively high energy density, and high overall electrochemical performance.

In some embodiments, the graphitization degree of the first composite particle is 0.3 to 0.6. A lower limit of the graphitization degree of the first composite particle may be 0.3, 0.4, or 0.5. An upper limit of the graphitization degree of the first composite particle may be 0.6, 0.5, or 0.4. The range of the graphitization degree of the first composite particle may be a reasonable combination of any upper limit and any lower limit mentioned above. Optionally, the graphitization degree of the first composite particle is 0.3 to 0.5. The relatively high graphitization degree of the first composite particle further improves the conductivity of the first active material layer 521, and the solid content of the slurry containing the first composite particle is relatively low.

In some embodiments, the graphitization degree of the second composite particle is 0.05 to 0.3. A lower limit of the graphitization degree of the second composite particle may be 0.05, 0.1, 0.15, 0.2, 0.25, or the like. An upper limit of the graphitization degree of the second composite particle may be 0.15, 0.20, 0.25, 0.30, or the like. The range of the graphitization degree of the second composite particle may be a reasonable combination of any upper limit and any lower limit mentioned above. Optionally, the graphitization degree of the second composite particle is 0.1 to 0.2. The relatively low graphitization degree of the second composite particle, on the basis of improving the conductivity of the second active material layer 522, increases the solid content in the slurry configured to prepare the second active material layer 522. The slurry with a low solid content and the slurry with a high solid content are used jointly to further reduce the difficulty of thick coating and increase the thickness of the positive active material layer 52.

If the average particle diameter of the composite particles is excessively small or the specific surface area is excessively high, the contact area between the composite particle and the electrolytic solution is excessively large. In this case, under the action of high voltage or high oxidizability, the electrolytic solution is prone to side reactions on the surface 511 of the composite particle, thereby aggravating gas production, increasing the generated heat, and deteriorating the safety performance and cycle performance of the secondary battery. If the average particle diameter of the composite particles is excessively large or the specific surface area is excessively low, the path for intercalation and deintercalation of lithium ions in the composite particle during charge-and-discharge cycles is excessively long, and the kinetic performance of the secondary battery is impaired.

In this application, the average particle diameter $D_{50}$ and/or specific surface area of the composite particles is controlled to fall within appropriate ranges to improve the performance of the secondary battery. $D_{v50}$, also known as a median diameter, is a particle diameter of a material measured when the cumulative volume percent of the specimen particles of the material reaches 50% in a volume-based particle size distribution. The value of $D_{50}$ may be measured by a laser diffraction particle size analyzer (such as Malvern Mastersizer 3000).

In some embodiments, the first composite particle includes a primary particle. The second composite particle includes a secondary particle formed by aggregating a plurality of primary particles. An average particle diameter $D_{50}$ of the first composite particle is less than an average particle diameter $D_{50}$ of the second composite particle. The difference in particle size between the second composite particle and the first composite particle can form a porous structure, thereby improving kinetic performance of the secondary battery.

As an example, the average particle diameter $D_{50}$ of the first composite particle is 1 μm to 4 μm. A lower limit of the average particle diameter $D_{50}$ of the first composite particle may be 1 μm, 2 μm, 3 μm, or the like. An upper limit of the average particle diameter $D_{50}$ of the first composite particle may be 2 μm, 3 μm, 4 μm, or the like. The range of the average particle diameter $D_{50}$ of the first composite particle may be a reasonable combination of any upper limit and any lower limit mentioned above, and optionally, may be 1 μm to 3 μm. The first composite particle with a particle diameter falling within the foregoing range can increase the area of contacting the electrolytic solution, and improve the rate performance of the secondary battery; and, during formation of the first active material layer 521, can increase the compaction density, and in turn, increase the energy density of the secondary battery.

As an example, the average particle diameter $D_{50}$ of the second composite particle is 6 μm to 12 μm. The lower limit of the average particle diameter $D_{50}$ of the second composite particle may be 6 μm, 7 μm, 8 μm, 9 μm, 10 μm, or 11 μm. The upper limit of the average particle diameter $D_{50}$ of the second composite particle may be 7 μm, 8 μm, 9 μm, 10 μm, 11 μm, or 12 μm. The range of the average particle diameter $D_{50}$ of the second composite particle may be a reasonable combination of any upper limit and any lower limit mentioned above, and optionally, may be 8 μm to 10 μm. By using the second composite particle with a particle diameter falling within the foregoing range, the slurry is not prone to phenomena such as agglomeration when being made into the second active material layer 522, and the relatively large average particle diameter $D_{50}$ of the second composite particle can significantly enhance the rate performance of the secondary battery.

Optionally, the second composite particle is of a spherical or quasi-spherical morphology. A specific surface area of this morphology is relatively large, thereby increasing a contact area between the second composite particle and an electrolytic solution, facilitating the electrolytic solution in infiltrating the second composite particle, and in turn, improving transfer performance of lithium ions, and enhancing the rate performance of the secondary battery.

In some embodiments, the specific surface area of the first composite particle is 10 m²/g to 15 m²/g. A lower limit of the specific surface area of the first composite particle is 10 m²/g, 11 m²/g, 12 m²/g, or 13 m²/g. An upper limit of the specific surface area of the first composite particles is 11 m²/g, 12 m²/g, 13 m²/g, 14 m²/g, 15 m²/g, or the like. The range of the specific surface area of the first composite particle may be a reasonable combination of any upper limit and any lower limit mentioned above, and optionally, may be 12 m²/g to 14 m²/g. The specific surface area of the first composite particle is relatively large, and the particles are dispersed evenly, thereby improving the effect of infiltrating the first composite particle by the electrolytic solution.

In some embodiments, the specific surface area of the second composite particle is 5 m²/g to 10 m²/g. A lower limit of the specific surface area of the second composite particle is 5 m²/g, 6 m²/g, or 7 m²/g. An upper limit of the specific surface area of the second composite particles is 7 m²/g, 8 m²/g, 9 m²/g, 10 m²/g, or the like. The range of the specific surface area of the second composite particle may be a reasonable combination of any upper limit and any lower limit mentioned above, and optionally, may be 6 m²/g to 8 m²/g. The second composite particles have a relatively small specific surface area and a relatively large particle diameter, and form a relatively large number of voids after being packed. When the slurry containing the second composite particles is applied onto the first active material layer 521 to form the second active material layer 522, a void gradient difference can be formed between the first active material layer 521 and the second active material layer 522, thereby facilitating transfer of lithium ions and improving the kinetic performance.

In some embodiments, a ratio of a coating weight CW1 of the first active material layer 521 to a coating weight CW2 of the second active material layer 522 is 0.8 to 1.2. A lower limit of the ratio may be 0.8, 0.9, 1.0 or 1.1, and an upper limit of the ratio may be 0.9, 1.0, 1.1, or 1.2. The range of the ratio may be a reasonable combination of any upper limit and any lower limit mentioned above. Optionally, the ratio of the coating weight CW1 of the first active material layer 521 to the coating weight CW2 of the second active material layer 522 is 1. The first active material layer 521 with a relatively high graphitization degree and the second active material layer 522 with a relatively low graphitization degree coordinate with each other to improve the coating characteristics of the positive active material layer 52, especially to facilitate thick coating processing, and in turn, increase the overall thickness of the positive active material layer 52.

As examples, the coating weight CW1 of the first active material layer 521 satisfies 0.115 mg/cm$^2$≤CW1≤0.195 mg/cm$^2$. A lower limit of CW1 may be 0.115 mg/cm$^2$, 0.120 mg/cm$^2$, 0.125 mg/cm$^2$, 0.130 mg/cm$^2$, 0.135 mg/cm$^2$, 0.140 mg/cm$^2$, 0.145 mg/cm$^2$, 0.150 mg/cm$^2$, 0.155 mg/cm$^2$, 0.160 mg/cm$^2$, 0.165 mg/cm$^2$, 0.170 mg/cm$^2$, 0.175 mg/$^2$, or 0.180 mg/cm$^2$. An upper limit of CW1 may be 0.125 mg/cm$^2$, 0.130 mg/cm$^2$, 0.135 mg/cm$^2$, 0.140 mg/cm$^2$, 0.145 mg/cm$^2$, 0.150 mg/cm$^2$, 0.155 mg/cm$^2$, 0.160 mg/cm$^2$, 0.165 mg/cm$^2$, 0.170 mg/cm$^2$, 0.175 mg/cm$^2$, 0.180 mg/cm$^2$, 0.185 mg/cm$^2$, 0.190 mg/cm$^2$, or 0.195 mg/cm$^2$. The range of CW1 may be a reasonable combination of any upper limit and any lower limit mentioned above.

In some examples, the coating weight CW2 of the second active material layer 522 satisfies 0.115 mg/cm$^2$≤CW2≤0.195 mg/cm$^2$. A lower limit of CW2 may be 0.115 mg/cm$^2$, 0.120 mg/cm$^2$, 0.125 mg/cm$^2$, 0.130 mg/cm$^2$, 0.135 mg/cm$^2$, 0.140 mg/cm$^2$, 0.145 mg/cm$^2$, 0.150 mg/cm$^2$, 0.155 mg/cm$^2$, 0.160 mg/cm$^2$, 0.165 mg/cm$^2$, 0.170 mg/cm$^2$, 0.175 mg/cm$^2$, or 0.180 mg/cm$^2$. An upper limit of CW2 may be 0.125 mg/cm$^2$, 0.130 mg/cm$^2$, 0.135 mg/cm$^2$, 0.140 mg/cm$^2$, 0.145 mg/cm$^2$, 0.150 mg/cm$^2$, 0.155 mg/cm$^2$, 0.160 mg/cm$^2$, 0.165 mg/cm$^2$, 0.170 mg/cm$^2$, 0.175 mg/cm$^2$, 0.180 mg/cm$^2$, 0.185 mg/cm$^2$, 0.190 mg/cm$^2$, or 0.195 mg/cm$^2$. The range of CW2 may be a reasonable combination of any upper limit and any lower limit mentioned above.

The first active material layer 521 and the second active material layer 522 coordinate with each other to increase the overall coating weight of the positive active material.

In some embodiments, a powder compaction density of the first active material layer 521 under a pressure of 600 MPa is 2.4 g/cc to 2.65 g/cc. A lower limit of the powder compaction density of the first active material layer 521 under a pressure of 600 MPa may be 2.4 g/cc, 2.45 g/cc, 2.50 g/cc, or 2.55 g/cc. An upper limit of the powder compaction density of the first active material layer 521 under a pressure of 600 MPa may be 2.45 g/cc, 2.50 g/cc, 2.55 g/cc, 2.60 g/cc, or 2.65 g/cc. The range of the powder compaction density may be a reasonable combination of any upper limit and any lower limit mentioned above, and optionally, may be 2.5 g/cc to 2.6 g/cc. The first active material layer 521 with a powder compaction density falling within the foregoing range increases the energy density of the secondary battery due to a relatively high compaction density.

In some embodiments, a powder compaction density of the second active material layer 522 under a pressure of 600 MPa is 2.2 g/cc to 2.45 g/cc. A lower limit of the powder compaction density of the second active material layer 522 under a pressure of 600 MPa may be 2.2 g/cc, 2.25 g/cc, 2.30 g/cc, or 2.35 g/cc. An upper limit of the powder compaction density of the second active material layer 522 under a pressure of 600 MPa may be 2.30 g/cc, 2.35 g/cc, 2.40 g/cc, or 2.45 g/cc. The range of the powder compaction density may be a reasonable combination of any upper limit and any lower limit mentioned above, and optionally, may be 2.35 g/cc to 2.45 g/cc. When the powder compaction density of the second active material layer 522 falls with the foregoing range, the powder compaction density of the second active material layer 522 is relatively low, and the particles in the slurry configured to prepare the second active material layer 522 are excellent in fluidity, dispersivity, and processability. The particles in the second active material layer 522 are of relatively high fluidity and can be dispersed uniformly, and, when used together with the slurry configured to prepare the first active material layer 521, facilitate preparation of the positive active material layer 52, and improve the quality of the positive electrode plate.

The first active material layer 521 and the second active material layer 522 coordinate with each other in terms of the powder compaction density to increase the overall compaction density of the positive active material layer 52, and in turn, increase the energy density of the secondary battery.

The positive active material layer 52 further optionally includes a conductive agent. The conductive agent is not particularly limited, and may be a conductive agent well known in the art. As an example, the conductive agent may include at least one of superconductive carbon, acetylene black, carbon black, Ketjen black, carbon dots, carbon nanotubes, graphene, or carbon nanofibers. The conductive agent can reduce the internal resistance of the positive active material layer 52 and increase the electrical conductivity between the positive active material layer 52 and the positive current collector 51. In this embodiment of this application, the carbon-coated lithium iron phosphate particles can improve the electrical conductivity of the positive active material layer 52 to some extent, and in turn, reduce the dosage of the conductive agent to some extent and relatively increase the dosage of the lithium iron phosphate particles, thereby improving the utilization rate of the positive active material, achieving a low resistance of electrode plates, and increasing the energy density of the secondary battery.

In some embodiments, the first active material layer 521 includes a first conductive agent. On a basis that a total weight of the first active material layer 521 is 100%, a mass percent of the first conductive agent is A. The second active material layer 522 includes a second conductive agent, and, on a basis that a total weight of the second active material layer 522 is 100%, a mass percent of the second conductive agent is B, where A<B, and optionally 1 wt %≤B−A≤3 wt %. Compared with the graphitization degree of the second active material layer 522, the graphitization degree of the first active material layer 521 is relatively higher. On the basis of ensuring conductivity of the first active material layer 521, the dosage of the conductive agent in the first active material layer 521 can be reduced, and the mass percent of the first composite particle can be increased, thereby increasing the energy density of the secondary battery.

The positive active material layer 52 further optionally includes a binder. The binder is not particularly limited, and may be a binder well known in the art. As an example, the binder may include one or more of styrene-butadiene rubber (SBR), water-based acrylic resin, carboxymethyl cellulose (CMC), polyvinylidene difluoride (PVDF), polytetrafluoroethylene (PTFE), poly(ethylene-co-vinyl acetate) (EVA), or polyvinyl alcohol (PVA).

The binder is configured to bind the composite particles to the conductive agent to ensure that a conductive network inside the positive electrode plate 50 is of high structural stability. Due to the low conductivity of the binder itself, the dosage of the binder may be relatively small, so as to achieve a low resistance of electrode plates.

Method for Preparing a Positive Electrode Plate

According to a second aspect, an embodiment of this application further provides a method for preparing a positive electrode plate.

The positive electrode plate according to this embodiment of this application may be prepared by coating. An illustrative preparation method is: coating at least one surface of the positive current collector with a first positive slurry to obtain a first active material layer; coating a surface of the first active material layer with the second positive slurry, where the surface is oriented away from the positive current collector, so as to obtain a second active material layer; and subsequently, performing steps such as drying and cold calendering on the first active material layer and the second active material layer to form a positive active material layer on the positive current collector, so as to obtain a positive electrode plate.

As an example, the method for preparing the positive electrode plate includes the following steps:

dispersing the first composite particles, a first conductive agent, a binder, and any other ingredients into a solvent (such as N-methyl-pyrrolidone, NMP) to form a first positive slurry, and coating a positive current collector with the first positive slurry;

dispersing the second composite particles, a second conductive agent, a binder, and any other ingredients into a solvent (such as N-methyl-pyrrolidone, NMP) to form a second positive slurry, and coating the first positive slurry with the second positive slurry; and performing steps such as drying and cold calendering on the first positive slurry and the second positive slurry to obtain a first active material layer and a second active material layer separately, thereby obtaining a positive electrode plate.

Secondary Battery

According to a third aspect, an embodiment of this application further provides a secondary battery.

Figure 3:
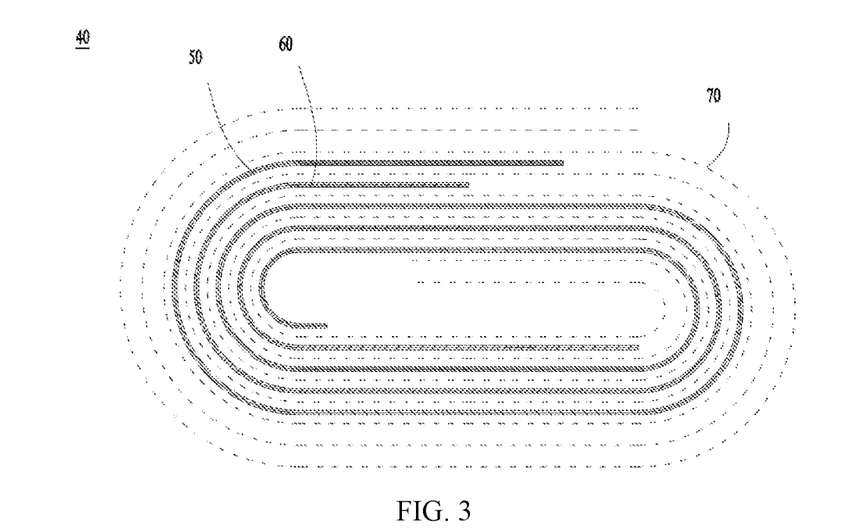
FIG. 3 is a schematic structural diagram of an electrode assembly of a secondary battery according to some embodiments of this application.
Figure 4:
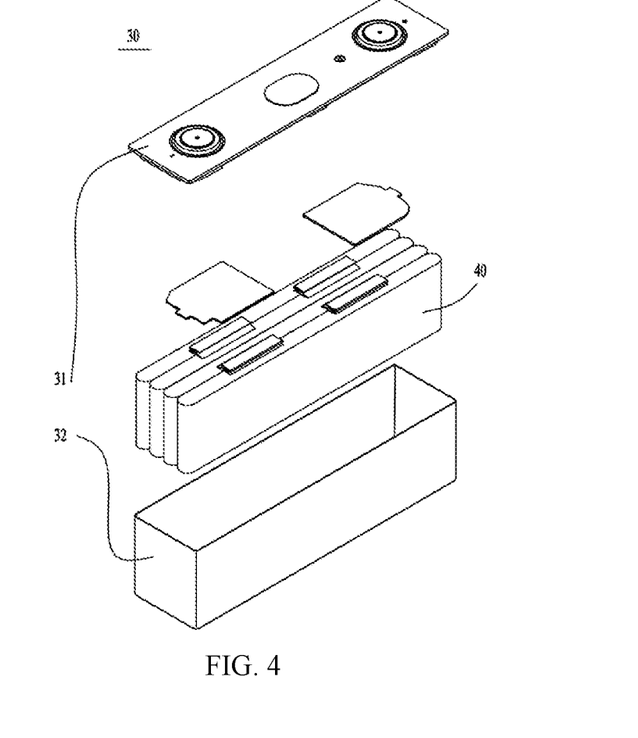
FIG. 4 is a schematic exploded view of a secondary battery according to some embodiments of this application.

FIG. 3 is a schematic structural diagram of an electrode assembly of a secondary battery according to some embodiments of this application, and FIG. 4 is a schematic exploded view of a secondary battery according to some embodiments of this application.

As shown in FIG. 3 and FIG. 4, the secondary battery according to this embodiment of this application includes a positive electrode plate 50, a negative electrode plate 60, a separator 70, and an electrolytic solution.

The positive electrode plate 50 is the positive electrode plate according to the first aspect of this application, or a positive electrode plate prepared by the preparation method according to the second aspect of this application. By using the positive electrode plate according to the first aspect of this application or the positive electrode plate prepared by the preparation method according to the second aspect of this application, the secondary battery according to this application achieves both relatively high rate performance and a relatively high energy density.

The negative electrode plate 60 may be a metal lithium sheet; or, may include a negative current collector and a negative active material layer disposed on at least one surface of the negative current collector. The negative active material layer includes a negative active material. The negative current collector is a copper foil.

In some embodiments, the negative active material in the negative active material layer may be a negative active material that is well-known in the art for use in a secondary battery. As an example, the negative active material may include at least one of the following materials: artificial graphite, natural graphite, soft carbon, hard carbon, silicon-based material, tin-based material, lithium titanium oxide, and the like. The silicon-based material may be at least one selected from simple-substance silicon, a silicon-oxygen compound, a silicon-carbon composite, a silicon-nitrogen composite, and a silicon alloy. The tin-based material may be at least one selected from simple-substance tin, a tin-oxygen compound, or a tin alloy. However, this application is not limited to such materials, and other conventional materials usable as a negative active material of a battery may be used instead. One of the negative active materials may be used alone, or at least two thereof may be used in combination.

In some embodiments, the negative active material layer further optionally includes a binder. The binder may be at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative active material layer further optionally includes a conductive agent. The conductive agent may be at least one selected from superconductive carbon, acetylene black, carbon black, Ketjen black, carbon dots, carbon nanotubes, graphene, or carbon nanofibers.

In some embodiments, the negative active material layer further optionally includes other agents, such as a thickener (for example, sodium carboxymethyl cellulose (CMC-Na)).

In some embodiments, the negative electrode plate 60 may be prepared according to the following method: dispersing the ingredients of the negative electrode plate 60 such as the negative active material, the conductive agent, and the binder and any other ingredients in a solvent (such as deionized water) to form a negative slurry, coating a negative current collector with the negative slurry, and performing steps such as drying and cold calendering to obtain the negative electrode plate 60.

The type of the separator 70 is not particularly limited in this application, and may be any well-known porous separator 70 that is highly stable both chemically and mechanically. In some embodiments, the separator 70 may be made of a material that is at least one selected from glass fiber, non-woven fabric, polyethylene, polypropylene, or polyvinylidene difluoride. The separator 70 may be a single-layer film or a multilayer composite film, without being particularly limited. When the separator 70 is a multilayer composite film, materials in different layers may be identical or different, without being particularly limited.

In some embodiments, the positive electrode plate 50, the negative electrode plate 60, and the separator 70 may be made into an electrode assembly 40 by winding or stacking. The electrode assembly 40 shown in FIG. 3 is jell-roll electrode assembly.

The electrolyte serves to conduct ions between the positive electrode plate 50 and the negative electrode plate 60. The type of the electrolyte is not particularly limited in this application, and may be selected as required. The electrolyte may be in a liquid state or gel state, or all solid state.

In some embodiments, the electrolyte is an electrolytic solution. The electrolytic solution includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato)phosphate, and lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethyl sulfonyl)ethane.

In some embodiments, the electrolytic solution further optionally includes an additive. For example, the additive may include a negative film-forming additive or a positive film-forming additive. The additive may further include an additive capable of improving specified performance of the battery, for example, an additive for improving overcharge performance of the battery, or an additive for improving high- or low-temperature performance of the battery.

Still referring to FIG. 3 and FIG. 4, the secondary battery 30 includes a cap assembly 31, a housing 32, and an electrode assembly 40 and an electrolytic solution that are accommodated in the housing 32. The electrode assembly 40 includes a positive electrode plate 50, a negative electrode plate 60, and a separator 70. The positive electrode plate 50 or the negative electrode plate 60 includes a tab. During charging and discharging of the secondary battery 30, intercalation and deintercalation of active ions occur back and forth between the positive electrode plate 50 and the negative electrode plate 60. The electrolyte serves to conduct ions between the positive electrode plate 50 and the negative electrode plate 60. Disposed between the positive electrode plate and the negative electrode plate, the separator 70 primarily serves to prevent a short circuit between the positive electrode plate 50 and the negative electrode plate 60 while allowing passage of ions. Specifically, the secondary battery 30 may be a jelly-roll or stacked battery, exemplarily but without being limited to, one of a lithium-ion secondary battery, a lithium primary battery, a sodium-ion battery, or a magnesium-ion battery.

In some embodiments, the housing 32 of the secondary battery may be a hard shell such as a hard plastic shell, an aluminum shell, a steel shell, or the like. Alternatively, the housing 32 of the secondary battery may be a soft package such as a pouch-type soft package. The soft package may be made of plastic such as polypropylene, polybutylene terephthalate, or polybutylene succinate.

In some embodiments, the secondary battery may be assembled to form a battery module. The battery module may include one or more secondary batteries, and the specific number of secondary batteries in a battery module may be selected by a person skilled in the art depending on practical applications and capacity of the battery module.

Figure 5:
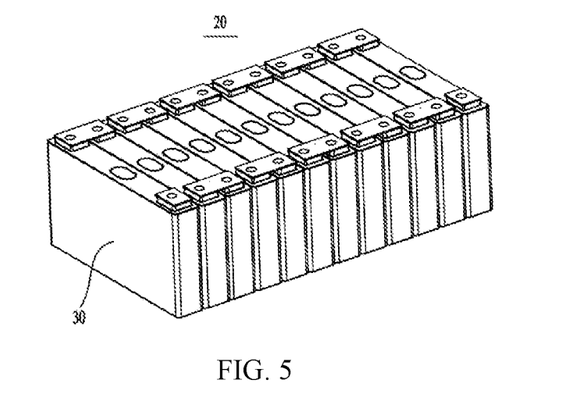
FIG. 5 is a schematic structural diagram of a battery module according to some embodiments of this application.

FIG. 5 is a schematic structural diagram of a battery module according to some embodiments of this application. As shown in FIG. 5, in the battery module 20, a plurality of secondary batteries 30 may be arranged sequentially along a length direction of the battery module 20. Alternatively, the secondary batteries may be arranged in any other manner. Further, the plurality of secondary batteries 30 may be fixed by a fastener.

Optionally, the battery module 20 may further include a shell that provides an accommodation space. The plurality of secondary batteries 30 are accommodated in the accommodation space.

In some embodiments, the battery module may be assembled to form a battery pack. The battery pack may include one or more battery modules, and the specific number of battery modules in a battery pack may be selected by a person skilled in the art depending on practical applications and capacity of the battery pack.

Figure 6:
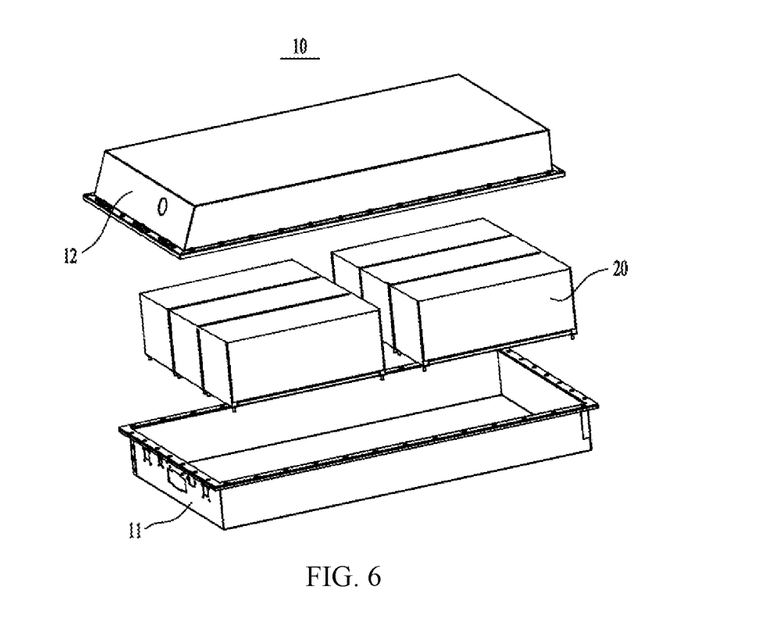
FIG. 6 is a schematic structural diagram of a battery pack according to some embodiments of this application.

FIG. 6 is a schematic structural diagram of a battery pack according to some embodiments of this application. As shown in FIG. 6, the battery pack 10 may contain a battery box and a plurality of battery modules 20 disposed in the battery box. The battery box includes an upper box 12 and a lower box 11. The upper box 12 fits the lower box 11 to form a closed space for accommodating the battery modules 20. The plurality of battery modules may be arranged in the battery box in any manner.

Further, this application provides an electrical device. The electrical device includes at least one of the secondary battery, the battery module, or the battery pack according to this application. The secondary battery, the battery module, or the battery pack may be used as a power supply of the electrical device, or used as an energy storage unit of the electrical device. The electrical device may include, but without being limited to, a mobile device (such 20 as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for use in the electrical device according to practical requirements of the electrical device.

Figure 7:
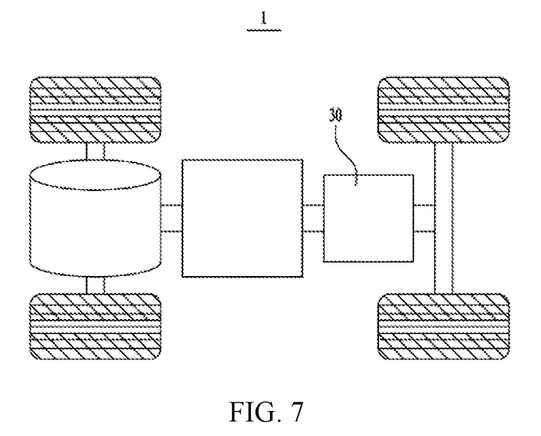
FIG. 7 is a schematic structural diagram of an electrical device according to some embodiments of this application.

FIG. 7 is a schematic structural diagram of an electrical device according to some embodiments of this application. The electrical device 1 includes a secondary battery 30. The electrical device 1 may be battery electric vehicle, a hybrid electric vehicle, a plug-in hybrid electric vehicle, or the like. The electrical device may adopt a battery pack or a battery module in order to meet the requirements of the electrical device 1 on a high power and a high energy density of the secondary battery 30.

In another example, the device may be a mobile phone, a tablet computer, a notebook computer, or the like. The device is generally required to be thin and light, and may have a secondary battery as a power supply.

EMBODIMENTS

The following describes embodiments of this application. The embodiments described below are illustrative, and are merely intended to construe this application but not to limit this application. Unless other techniques or conditions are expressly specified in an embodiment hereof, the techniques or conditions described in the literature in this field or in an instruction manual of the product may apply. A reagent or instrument used herein without specifying the manufacturer is a conventional product that is commercially available in the market.

The secondary batteries in Embodiments 1 to 35 and Comparative Embodiments 1 to 4 are prepared by using the following method:

1. Preparing a Positive Current Collector

The positive current collector is an aluminum foil that is 13 μm thick.

2. Preparing a Positive Electrode Plate

2-1. Preparing a First Positive Slurry

Mixing well the first composite particle, conductive carbon black, polyvinylidene difluoride as a binder, and a dispersant at a preset mass ratio, as shown in Table 1, and then adding N-methyl-pyrrolidone, and stirring and dispersing the added substances to make a first positive slurry with a viscosity of 8000 mPa·s to 20000 mPa·s. In the mixture above, with the mass of the first composite particles and the mass of the conductive carbon black considered in aggregate, a mass ratio between the aggregate mass, the binder, and the dispersant is 97: 2.5:0.5. The first composite particles are graphitized olivine-structured lithium iron phosphate.

2-2. Preparing a Second Positive Slurry

Mixing well the second composite particle, conductive carbon black, polyvinylidene difluoride as a binder, and a dispersant at a preset mass ratio, as shown in Table 2, and then adding N-methyl-pyrrolidone, and stirring and dispersing the added substances to make a second positive slurry with a viscosity of 8000 mPa·s to 20000 mPa·s. In the mixture above, with the mass of the second composite particles and the mass of the conductive carbon black considered in aggregate, a mass ratio between the aggregate mass, the binder, and the dispersant is 97:2.5:0.5. The second composite particles are graphitized olivine-structured lithium iron phosphate.

2-3. Preparing a Positive Electrode Plate

Applying the first positive slurry and the second positive slurry onto an aluminum foil by a double-sided double-chamber applicator. Performing steps of drying, cold calendering, and slitting to make a positive electrode plate. In applying the slurry, the first positive slurry is located between the second positive slurry and the aluminum foil.

3. Preparing a Negative Current Collector

The negative current collector is a copper foil that is 6 μm thick.

4. Preparing a Conventional Negative Electrode Plate

Mixing well graphite as a negative active material, conductive carbon black, styrene-butadiene rubber (SBR) as a binder, and sodium carboxymethyl cellulose (CMC) as a thickener at a mass ratio of 95:1.0:2.0:2 in an appropriate amount of deionized water to form a homogeneous negative slurry. Coating the negative current collector with the negative slurry, and performing steps such as drying to obtain a negative electrode plate.

5. Separator

The separator is a PP film.

6. Preparing an Electrolytic Solution

Mixing ethylene carbonate (EC) and ethyl methyl carbonate (EMC) at a volume ratio of 3:7 homogeneously to obtain an organic solvent, and then dissolving 1 mol/L $LiPF_6$ in the organic solvent evenly.

7. Preparing a Lithium-Ion Secondary Battery

Stacking the positive electrode plate, the separator, and the negative electrode plate in sequence, then winding them into an electrode assembly, and putting the electrode assembly into a packaging shell. Injecting the electrolytic solution into the electrode assembly, and then performing steps such as sealing, standing, hot and cold pressing, and chemical formation to obtain a lithium-ion secondary battery.

Performance Test

Testing the Composite Particles (1) Measuring the Average Particle Diameter $D_{50}$ of the Composite Particles Carrying out the test with a Malvern 2000 (MasterSizer 2000) laser particle size analyzer based on the Chinese National Standard GB/T19077-2016/ISO 13320:2009. The test process is as follows: Pretreatment: Taking a clean beaker, adding an appropriate amount of specimen into the beaker, adding a dispersant into the beaker, and sonicating the mixture at 120 W for 5 minutes to ensure complete dispersion of the specimen in the dispersant.

Test: Pouring the specimen into a specimen in-feed tower so that the specimen is circulated to a testing optical path system along with the solution. Irradiating the particles with a laser beam, receiving diffused light, and measuring energy distribution of the diffused light to obtain particle size distribution characteristics of the particles (shading degree: 8% to 12%). Specifically, the specimen may be measured based on the standard GB/T19077-2016/ISO 13320:2009.

(2) Testing the Graphitization Degree of the Composite Particles

Laying the composite particles flat on a glass sheet, putting the glass sheet under a Laser Raman spectrometer, observing Raman peaks on the surface, determining an intensity ratio $I_{1360}/I_{1580}$ between two peaks in a Raman spectrogram, selecting 3 to 5 points for determining the ratio and averaging out the values to obtain the graphitization degree of the composite particles.

(3) Testing the Morphology of the Composite Particles

Testing the morphology of a specimen with a ZEISS sigma 300 scanning electron microscope with reference to the Chinese Standard JY/T010-1996, and observing the morphology of the specimen.

The test steps are as follows:
1. Making a specimen: Cutting out a specimen of 5 mm×5 mm in size (including an abnormal region) by using scissors, and sticking the specimen onto a specimen holder on which a conductive adhesive is affixed. Marking the abnormal region by poking holes around the abnormal region with tweezers.

2. Setting parameters: mode: In-lens; voltage: 10 KV; optical stop: 30 μm, working distance: 4.5 mm.
3. Test procedure: Moving the specimen at a magnification of approximately 50× to confirm the abnormal position, photographing the abnormal position at a magnification of 30 K, 10 K, 5 K, 3 K, 1 K, 500, 200, and 50 separately (the image observed at the minimum magnification needs to include the entire abnormal region), and photographing the normal regions at a magnification of 30 K, 10 K, 5 K, 3 K, 1 K, and 500 separately.

Testing the Performance of the Secondary Battery (1) Testing the Rate Performance of the Lithium-Ion Secondary Battery Leaving a fresh lithium-ion secondary battery to stand for 30 minutes in a 25° C. environment, discharging the battery at a constant current rate of 0.33 C until the voltage reaches 2.5 V, and then discharging the battery at a constant current of 0.33 C until the voltage reaches 2.0 V, and leaving the battery to stand for 60 minutes. Subsequently, charging the battery at a constant current of 0.33 C until the voltage reaches 3.65 V, and then charging the battery at a constant voltage until the current reaches 0.05 C.

Leaving the battery to stand for 30 minutes in a 25° C. environment, discharging the battery at a constant current rate of 0.33 C until the voltage reaches 2.5 V, and then discharging the battery at a constant current of 0.33 C until the voltage reaches 2.0 V, and leaving the battery to stand for 30 minutes. Measuring the discharge capacity of the lithium-ion secondary battery discharged at a rate of 0.33 C.

Leaving the battery to stand for 30 minutes in a 25° C. environment, discharging the battery at a constant current rate of 1 C until the voltage reaches 2.5 V, and then discharging the battery at a constant current of 1 C until the voltage reaches 2.0 V, and leaving the battery to stand for 30 minutes. Measuring the discharge capacity of the lithium-ion secondary battery discharged at a rate of 1 C.

Discharge capacity retention rate of lithium-ion secondary battery discharged at a 1 C rate (%)=discharge capacity of the battery discharged at a 1 C rate/discharge capacity of the battery discharged at a 0.33 C rate×100%.

(2) Testing the Direct Current Resistance (DCR)

Leaving the lithium-ion secondary battery to stand for 30 minutes in a 25° C. environment, charging the battery at a constant current of 0.33 C until the voltage reaches 3.65 V, charging the battery at a constant voltage until a cut-off current of 0.05 C, leaving the battery to stand for 5 minutes, and then discharging the battery at 0.33 C until a cut-off current of 0.5 C, and leaving the battery to stand for 60 minutes. Subsequently, discharging the battery at 5 C for 30 seconds, and recording the voltage $V_1$ at the end of the discharge, leaving the battery to stand for 40 seconds, charging the battery at a constant current of 3.75 C for 30 seconds, leaving the battery to stand for 60 minutes, and then charging the battery at a constant current of 0.33 C until the voltage reaches 3.65 V, charging the battery at a constant voltage until a cut-off current of 0.05 C, leaving the battery to stand for 5 minutes, and then discharging the battery at 0.33 C until a cut-off current of 0.9 C, and leaving the battery to stand for 60 minutes. Subsequently, discharging the battery at 5 C for 30 seconds, recording the voltage $V_2$ at the end of the discharge, and leaving the battery to stand for 40 seconds. Subsequently, charging the battery at a constant current of 3.75 C for 30 seconds, and leaving the battery to stand for 5 minutes.

Calculating the DCR according to the following formula: $R=(V_2-V_1)/I$, where the unit of the DCR is mΩ.

(3) An Illustrative Method for Measuring the Gravimetric Energy Density of the Secondary Battery is as Follows Weighing the battery with an electronic scale to obtain a weight W (unit: kg). Charging the battery at a constant current of ⅓ C in a 25° C. environment until the voltage reaches an upper-limit rated voltage of the battery, and then charging the battery at a constant voltage until the current drops to 0.05 C, and leaving the battery to stand for 15 minutes. Subsequently, discharging the battery at a constant current of ⅓ C until the voltage reaches a lower-limit rated voltage of the battery, and leaving the battery to stand for 5 minutes. Measuring the discharge energy of the battery. Repeating the foregoing test steps for 3 times, averaging out the measured values of the discharge energy to obtain an average discharge energy E (unit: Wh) of the battery. Calculating according to the following formula: gravimetric energy density of the battery=E/W.

Table 1 and Table 2 show the parameters of Embodiments 1 to 27 and Comparative Embodiments 1 to 3.

TABLE 1

| | | First active material layer | | | | | |
|---|---|---|---|---|---|---|---|
| | Graphitization degree | $D_{50}$ of first composite particle (μm) | BET specific surface area of first composite particle (m²/g) | CW1 of first composite particle (mg/cm²) | Mass percent of first composite particle (%) | Mass percent A of first conductive agent (%) | Compaction density (g/cc) |
| Embodiment 1 | 0.2 | 2 | 3 | 0.175 | 96 | 1 | 2.5 |
| Embodiment 2 | 0.3 | 2 | 13 | 0.175 | 96 | 1 | 2.5 |
| Embodiment 3 | 0.4 | 2 | 13 | 0.175 | 96 | 1 | 2.5 |
| Embodiment 4 | 0.5 | 2 | 13 | 0.175 | 96 | 1 | 2.5 |
| Embodiment 5 | 0.6 | 2 | 13 | 0.175 | 96 | 1 | 2.5 |
| Embodiment 6 | 0.8 | 2 | 13 | 0.175 | 96 | 1 | 2.5 |
| Embodiment 7 | 0.4 | 2 | 13 | 0.115 | 96 | 1 | 2.5 |
| Embodiment 8 | 0.4 | 2 | 13 | 0.155 | 96 | 1 | 2.5 |

TABLE 1-continued

| | First active material layer | | | | | |
|---|---|---|---|---|---|---|
| | Graphitization degree | $D_{50}$ of first composite particle (μm) | BET specific surface area of first composite particle ($m^2/g$) | CW1 of first composite particle ($mg/cm^2$) | Mass percent of first composite particle (%) | Mass percent A of first conductive agent (%) | Compaction density (g/cc) |
| Embodiment 9 | 0.4 | 2 | 13 | 0.175 | 96 | 1 | 2.5 |
| Embodiment 10 | 0.4 | 2 | 13 | 0.175 | 96 | 1 | 2.5 |
| Embodiment 11 | 0.4 | 2 | 13 | 0.195 | 96 | 1 | 2.5 |
| Embodiment 12 | 0.4 | 2 | 13 | 0.175 | 93.5 | 2.5 | 2.5 |
| Embodiment 13 | 0.4 | 2 | 13 | 0.175 | 94 | 2 | 2.5 |
| Embodiment 14 | 0.4 | 2 | 13 | 0.175 | 96 | 1 | 2.5 |
| Embodiment 15 | 0.4 | 2 | 13 | 0.175 | 97 | 0 | 2.5 |
| Embodiment 16 | 0.4 | 2 | 13 | 0.175 | 96 | 1 | 2.2 |
| Embodiment 17 | 0.4 | 2 | 13 | 0.175 | 96 | 1 | 2.4 |
| Embodiment 18 | 0.4 | 2 | 13 | 0.175 | 96 | 1 | 2.5 |
| Embodiment 19 | 0.4 | 2 | 13 | 0.175 | 96 | 1 | 2.6 |
| Embodiment 20 | 0.4 | 2 | 13 | 0.175 | 96 | 1 | 2.65 |
| Embodiment 21 | 0.4 | 2 | 13 | 0.175 | 96 | 1 | 2.7 |
| Embodiment 22 | 0.4 | 2 | 13 | 0.175 | 96 | 1 | 2.5 |
| Embodiment 23 | 0.4 | 2 | 13 | 0.175 | 96 | 1 | 2.5 |
| Embodiment 24 | 0.4 | 2 | 13 | 0.175 | 96 | 1 | 2.5 |
| Embodiment 25 | 0.4 | 2 | 13 | 0.175 | 96 | 1 | 2.5 |
| Embodiment 26 | 0.4 | 2 | 13 | 0.175 | 96 | 1 | 2.5 |
| Embodiment 27 | 0.4 | 2 | 13 | 0.175 | 96 | 1 | 2.5 |
| Comparative Embodiment 1 | / | / | / | / | / | / | / |

TABLE 2

| | Second active material layer | | | | | | | | |
|---|---|---|---|---|---|---|---|---|---|
| | Graphitization degree | $D_{50}$ of second composite particle (μm) | BET specific surface area of second composite particle ($m^2/g$) | CW2 of second composite particle ($mg/cm^2$) | Mass percent of second composite particle (%) | Mass percent B of second conductive agent (%) | Compaction density (g/cc) | CW1/CW2 | B − A (%) |
| Embodiment 1 | 0.05 | 6 | 10 | 0.175 | 94 | 3 | 2.4 | 1 | 2 |
| Embodiment 2 | 0.1 | 6 | 10 | 0.175 | 94 | 3 | 2.4 | 1 | 2 |
| Embodiment 3 | 0.2 | 6 | 10 | 0.175 | 94 | 3 | 2.4 | 1 | 2 |
| Embodiment 4 | 0.2 | 6 | 10 | 0.175 | 94 | 3 | 2.4 | 1 | 2 |
| Embodiment 5 | 0.3 | 6 | 10 | 0.175 | 94 | 3 | 2.4 | 1 | 2 |
| Embodiment 6 | 0.4 | 6 | 10 | 0.175 | 94 | 3 | 2.4 | 1 | 2 |
| Embodiment 7 | 0.2 | 6 | 10 | 0.164 | 94 | 3 | 2.4 | 0.7 | 2 |
| Embodiment 8 | 0.2 | 6 | 10 | 0.194 | 94 | 3 | 2.4 | 0.8 | 2 |
| Embodiment 9 | 0.2 | 6 | 10 | 0.175 | 94 | 3 | 2.4 | 1 | 2 |
| Embodiment 10 | 0.2 | 6 | 10 | 0.146 | 94 | 3 | 2.4 | 1.2 | 2 |
| Embodiment 11 | 0.2 | 6 | 10 | 0.15 | 94 | 3 | 2.4 | 1.3 | 2 |
| Embodiment 12 | 0.2 | 6 | 10 | 0.175 | 94 | 3 | 2.4 | 1 | 0.5 |
| Embodiment 13 | 0.2 | 6 | 10 | 0.175 | 94 | 3 | 2.4 | 1 | 1 |
| Embodiment 14 | 0.2 | 6 | 10 | 0.175 | 94 | 3 | 2.4 | 1 | 2 |
| Embodiment 15 | 0.2 | 6 | 10 | 0.175 | 94 | 3 | 2.4 | 1 | 3 |
| Embodiment 16 | 0.2 | 6 | 10 | 0.175 | 94 | 3 | 2.4 | 1 | 2 |
| Embodiment 17 | 0.2 | 6 | 10 | 0.175 | 94 | 3 | 2.4 | 1 | 2 |
| Embodiment 18 | 0.2 | 6 | 10 | 0.175 | 94 | 3 | 2.4 | 1 | 2 |
| Embodiment 19 | 0.2 | 6 | 10 | 0.175 | 94 | 3 | 2.4 | 1 | 2 |
| Embodiment 20 | 0.2 | 6 | 10 | 0.175 | 94 | 3 | 2.4 | 1 | 2 |
| Embodiment 21 | 0.2 | 6 | 10 | 0.175 | 94 | 3 | 2.4 | 1 | 2 |
| Embodiment 22 | 0.2 | 6 | 10 | 0.175 | 94 | 3 | 2.1 | 1 | 2 |
| Embodiment 23 | 0.2 | 6 | 10 | 0.175 | 94 | 3 | 2.2 | 1 | 2 |
| Embodiment 24 | 0.2 | 6 | 10 | 0.175 | 94 | 3 | 2.35 | 1 | 2 |
| Embodiment 25 | 0.2 | 6 | 10 | 0.175 | 94 | 3 | 2.4 | 1 | 2 |
| Embodiment 26 | 0.2 | 6 | 10 | 0.175 | 94 | 3 | 2.45 | 1 | 2 |
| Embodiment 27 | 0.2 | 6 | 10 | 0.175 | 94 | 3 | 2.6 | 1 | 2 |
| Comparative Embodiment 1 | 0.2 | 6 | 10 | 0.35 | 94 | 3 | 2.4 | / | / |

Table 3 shows the test results of Embodiments 1 to 27 and Comparative Embodiments 1 to 4.

TABLE 3

| | Performance of secondary battery | | |
|---|---|---|---|
| | Energy retention rate of the battery discharged at a 1 C rate (%) | Energy density (Wh/kg) | 25° C. 50% SOC direct-current resistance (mΩ) |
| Embodiment 1 | 85.0% | 185 | 48.00 |
| Embodiment 2 | 94.0% | 188 | 38.00 |
| Embodiment 3 | 94.3% | 190 | 36.00 |
| Embodiment 4 | 96.0% | 185 | 35.80 |
| Embodiment 5 | 96.3% | 183 | 32.00 |
| Embodiment 6 | 96.8% | 178 | 31.30 |
| Embodiment 7 | 93.2% | 188 | 37.00 |
| Embodiment 8 | 93.8% | 190 | 35.30 |
| Embodiment 9 | 94.0% | 190.6 | 35.80 |
| Embodiment 10 | 94.3% | 191.8 | 35.50 |
| Embodiment 11 | 93.0% | 192 | 39.00 |
| Embodiment 12 | 94.0% | 186 | 36.00 |
| Embodiment 13 | 94.0% | 187 | 36.00 |
| Embodiment 14 | 94.0% | 190 | 36.00 |
| Embodiment 15 | 94.0% | 191 | 36.00 |
| Embodiment 16 | 92.5% | 178 | 40.00 |
| Embodiment 17 | 93.2% | 183 | 35.00 |
| Embodiment 18 | 96.0% | 190 | 34.80 |
| Embodiment 19 | 96.5% | 191 | 33.00 |
| Embodiment 20 | 96.8% | 193 | 32.00 |
| Embodiment 21 | 91.0% | 193.8 | 38.50 |
| Embodiment 22 | 93.0% | 178 | 45.00 |
| Embodiment 23 | 93.4% | 182 | 37.00 |
| Embodiment 24 | 93.8% | 186 | 37.20 |
| Embodiment 25 | 96.0% | 190 | 38.00 |
| Embodiment 26 | 96.5% | 191 | 37.60 |
| Embodiment 27 | 93.2% | 192 | 43.00 |
| Comparative Embodiment 1 | 86% | 178 | 33.20 |

As can be seen from Table 1 to Table 3, Comparative Embodiment 1 adopts one graphitized positive active material layer, and therefore, achieves relatively good rate performance. Compared with Comparative Embodiment 1, Embodiments 1 to 27 have increased the energy density significantly. Therefore, the secondary batteries of Embodiments 1 to 27 can achieve a good trade-off between rate performance and energy density.

The graphitization degree of the first active material layer and the second active material layer in Embodiments 1 to 6 is relatively high, and therefore, the rate performance of the secondary battery is relatively high, and the direct-current resistance is relatively low. With the increase of the graphitization degree, the rate performance is higher. In addition, the rate performance and the energy density in Embodiment 3 are relatively high.

In Embodiments 7 to 14, the mass percent of the graphitized first active material layer contained in the secondary battery is relatively high, and therefore, the rate performance is relatively high, and the direct-current resistance is relatively low. In addition, due to the relatively high compaction density of the first active material layer, the energy density of the secondary battery is increased.

In Embodiments 12 to 15, on the basis of adopting the first active material layer with a relatively high graphitization degree, the mass percent of the conductive agent in the first active material layer is reduced. Therefore, the energy density is increased without noticeably deteriorating the rate performance.

In Embodiments 16 to 21, to the extent that the compaction density is in a reasonable range, the increase of the compaction density of the first active material layer leads to increase of the energy density of the secondary battery, and also leads to improvement of the rate performance.

In Embodiments 22 to 27, to the extent that the compaction density is in a reasonable range, the increase of the compaction density of the second active material layer leads to increase of the energy density of the secondary battery, and also leads to improvement of the rate performance.

Figure 8:
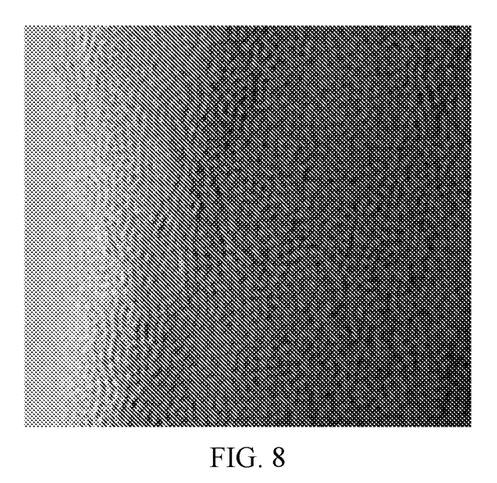
FIG. 8 is a TEM image of a first active material layer of a positive electrode plate according to some embodiments of this application.
Figure 9:
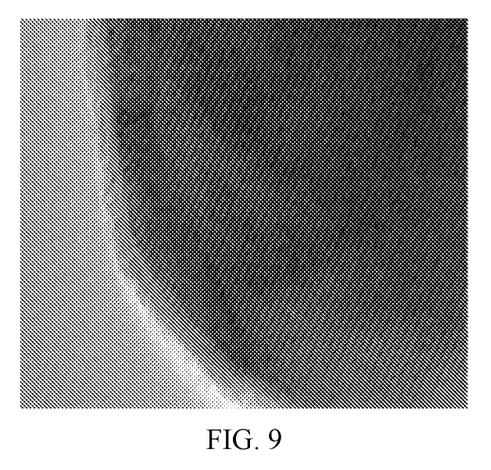
FIG. 9 is a TEM image of a second active material layer of a positive electrode plate according to some embodiments of this application.
Figure 10:
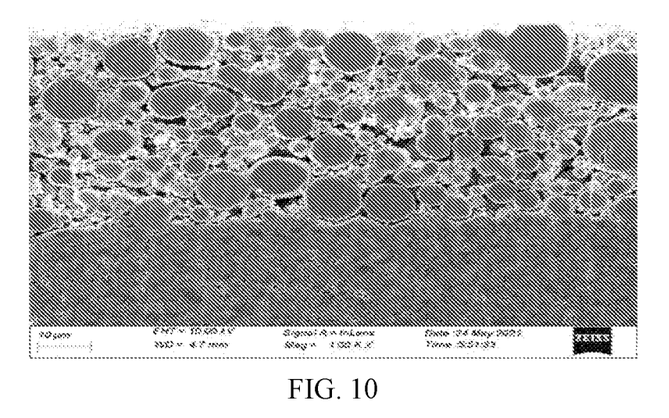
FIG. 10 is a local SEM image of a positive electrode plate according to some embodiments of this application.

FIG. 8 is a transmission electron microscope (TEM) image of a first composite particle according to Embodiment 1; FIG. 9 is a TEM image of a second composite particle according to Embodiment 1; and FIG. 10 is a local scanning electron microscope (SEM) image of a positive electrode plate according to Embodiment 1. As shown in FIG. 8 to FIG. 10, the average particle diameter $D_{50}$ of the first active material layer in Embodiment 1 is relatively small, and the particles are closely distributed. The average particle diameter $D_{50}$ of the second active material layer is relatively large, and a porous structure can be formed between the first active material layer and the second active material layer.

Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner.

What is claimed is:

1. A positive electrode plate, comprising:
    a positive current collector; and
    a positive active material layer disposed on at least one surface of the positive current collector,
    wherein the positive active material layer comprises a first active material layer and a second active material layer that are sequentially stacked in a direction away from the surface, the first active material layer comprises a first composite particle, the first composite particle comprises a first lithium iron phosphate particle and a first carbon layer that coats a surface of the first lithium iron phosphate particle, the second active material layer comprises a second composite particle, the second composite particle comprises a second lithium iron phosphate particle and a second carbon layer that coats a surface of the second lithium iron phosphate particle, and
    wherein a graphitization degree of the first composite particle is 0.3 to 0.5, and a graphitization degree of the second composite particle is 0.1 to 0.2.

2. The positive electrode plate according to claim 1, wherein
    the first composite particle comprises a primary particle,
    the second composite particle comprises a secondary particle formed by aggregating a plurality of primary particles, and an average particle diameter Ds of the first composite particle is less than an average particle diameter $D_{50}$ of the second composite particle.

3. The positive electrode plate according to claim 2, wherein
    the average particle diameter $D_{50}$ of the first composite particle is 1 μm to 4 μm; and/or
    the average particle diameter $D_{50}$ of the second composite particle is 6 μm to 12 μm.

4. The positive electrode plate according to claim 2, wherein the secondary particle is of a spherical or quasi-spherical morphology.

5. The positive electrode plate according to claim 1, wherein a specific surface area of the first composite particle is 10 $m^2/g$ to 15 $m^2/g$; and/or a specific surface area of the second composite particle is 5 $m^2/g$ to 10 $m^2/g$.

6. The positive electrode plate according to claim 1, wherein a ratio of a coating weight CW1 of the first active material layer to a coating weight CW2 of the second active material layer is 0.8 to 1.2.

7. The positive electrode plate according to claim 6, wherein the coating weight CW1 of the first active material layer satisfies 0.115 mg/$cm^2$ ≤ CW1 ≤ 0.195 mg/$cm^2$; and/or the coating weight CW2 of the second active material layer satisfies 0.115 mg/$cm^2$ ≤ CW2 ≤ 0.195 mg/$cm^2$.

8. The positive electrode plate according to claim 1, wherein the first active material layer comprises a first conductive agent, and, on a basis that a total weight of the first active material layer is 100%, a mass percent of the first conductive agent is A; and the second active material layer comprises a second conductive agent, and, on a basis that a total weight of the second active material layer is 100%, a mass percent of the second conductive agent is B, wherein A<B, and 1 wt % ≤ B−A ≤ 3 wt %.

9. The positive electrode plate according to claim 1, wherein a powder compaction density of the first active material layer under a pressure of 600 MPa is 2.4 g/cc to 2.65 g/cc; and/or a powder compaction density of the second active material layer under a pressure of 600 MPa is 2.2 g/cc to 2.45 g/cc.

10. A secondary battery, comprising a positive electrode plate, a separator, and a negative electrode plate, wherein the positive electrode plate is the positive electrode plate according to claim 1.

11. A battery module, comprising the secondary battery according to claim 10.

12. A battery pack, comprising the battery module according to claim 11.

13. An electrical device, comprising the battery pack according to claim 12.

\* \* \* \* \*